(12) United States Patent
Yang et al.

(10) Patent No.: US 12,427,485 B2
(45) Date of Patent: Sep. 30, 2025

(54) EFFICIENT AND STABLE MAGNETIC NANOFIBER MEMBRANE AND PREPARATION METHOD AND USE THEREOF

(71) Applicant: Beijing Normal University, Zhuhai, Zhuhai (CN)

(72) Inventors: Yi Yang, Zhuhai (CN); Huiqi Zhu, Zhuhai (CN); Xuhui Xu, Zhuhai (CN); Lulu Bao, Zhuhai (CN); Ruikun Xu, Zhuhai (CN); Yuxi Long, Zhuhai (CN); Chenyang Zheng, Zhuhai (CN); Haowen Lin, Zhuahi (CN); Yinuo Wang, Zhuhai (CN); Minyi Liu, Zhuhai (CN); Ying Li, Zhuhai (CN); Xintong You, Zhuhai (CN)

(73) Assignee: Beijing Normal University, Zhuhai, Zhuhai (CN)

( * ) Notice: Subject to any disclaimer, the term of this patent is extended or adjusted under 35 U.S.C. 154(b) by 451 days.

(21) Appl. No.: 18/055,602

(22) Filed: Nov. 15, 2022

(65) Prior Publication Data
US 2023/0285905 A1    Sep. 14, 2023

(30) Foreign Application Priority Data
Mar. 11, 2022   (CN) .......................... 202210237371.6

(51) Int. Cl.
*B01D 67/00* (2006.01)
*B01D 71/28* (2006.01)
(Continued)

(52) U.S. Cl.
CPC ....... *B01D 67/0002* (2013.01); *B01D 71/281* (2022.08); *B01D 71/421* (2022.08);
(Continued)

(58) Field of Classification Search
None
See application file for complete search history.

(56) References Cited

U.S. PATENT DOCUMENTS 11,746,026 B1 * 9/2023 Yang .................... B01D 69/148
                                                          210/650

FOREIGN PATENT DOCUMENTS

CN            113699684 A    * 11/2021    ............... D01G 1/02

OTHER PUBLICATIONS

Xiao et al Immobilization of Zerovalent Iron Nanoparticles into Electrospun Polymer Nanofibers: Synthesis, Characterization, and Potential Environmental Applications, J. Phys. Chem. C 2009, 113, 18062-18068 (Year: 2009).*

(Continued)

*Primary Examiner* — Krishnan S Menon
(74) *Attorney, Agent, or Firm* — Heslin Rothenberg Farley and Mesiti, PC; Victor A. Cardona, Esq.

(57) ABSTRACT

The present disclosure provides an efficient and stable magnetic nanofiber membrane and a preparation method and use thereof, and belongs to the technical field of composites. The preparation method includes the following steps: dissolving polyacrylonitrile or polystyrene, nZVI particles, and n-octyltrimethylammonium bromide in N,N-dimethylformamide, and mixing uniformly to obtain a spinning solution; subjecting the spinning solution to electrospinning; and vacuum-drying a resulting fiber membrane to obtain the efficient and stable magnetic nanofiber membrane. In the present disclosure, the magnetic nanofiber membrane has a high specific surface area, a desirable porosity, an excellent mechanical strength, and satisfactory magnetic properties. The membrane effectively exerts a synergistic effect of the nZVI particles and an organic polymer material carrier, avoids easy oxidation of a catalyst surface and easy particle (Continued)

agglomeration, enhances a catalytic activity of the magnetic nanofiber membrane, and improves an efficiency in organic wastewater treatment.

7 Claims, 6 Drawing Sheets (51) Int. Cl.
*B01D 71/42* (2006.01)
*C02F 1/44* (2023.01)
*C02F 1/48* (2023.01)
*C02F 101/30* (2006.01)
*C02F 103/00* (2006.01)

(52) U.S. Cl.
CPC .................. *C02F 1/44* (2013.01); *C02F 1/48* (2013.01); *B01D 2325/0281* (2022.08); *B01D 2325/46* (2013.01); *C02F 2101/30* (2013.01); *C02F 2103/005* (2013.01); *C02F 2201/48* (2013.01)

(56) References Cited

OTHER PUBLICATIONS

Velasquez-Velez et al, Electrospinning of polyacrylonitrile nanofibers embedded with zerovalent iron and cerium oxide nanoparticles, as Cr(VI) adsorbents for water treatment, J. Appl. Polym. Sci. 2020, DOI: 10.1002/APP.48663 (Year: 2020).*

Liu et al, Highly efficient immobilization of NZVI onto bio-inspired reagents functionalized polyacrylonitrile membrane for Cr(VI) reduction, Chemosphere 220 (2019) 1003e1013 (Year: 2019).*

* cited by examiner

EFFICIENT AND STABLE MAGNETIC NANOFIBER MEMBRANE AND PREPARATION METHOD AND USE THEREOF

CROSS REFERENCE TO RELATED APPLICATION

This patent application claims the benefit and priority of Chinese Patent Application No. 202210237371.6, filed with the China National Intellectual Property Administration on Mar. 11, 2022, the disclosure of which is incorporated by reference herein in its entirety as part of the present application.

TECHNICAL FIELD

The present disclosure relates to the technical field of composites, in particular to an efficient and stable magnetic nanofiber membrane and a preparation method and use thereof.

BACKGROUND

With the rapid advancement of industrialization and modernization, people are facing increasingly serious water pollution, and it is extremely urgent to conduct the protection and remediation of polluted water bodies. The treatment of industrial wastewater is also becoming even more important. Industrial organic wastewater refers to a type of industrial wastewater containing carbohydrates, proteins, lipids and other components, which mainly comes from chemical, pharmaceutical and other industrial productions. Direct discharge of organic sewage may cause great damages to the ecological environment and seriously threaten the survival of local organisms and human beings. Due to a complex composition (such as chlorinated compounds, halogenated aliphatic compounds, nitrates, nitroaromatic carbon, and phenols), high toxicity, and difficulty in sedimentation, the organic wastewater has brought many difficulties to the sewage purification. At present, the existing industrial technologies for organic wastewater treatment generally have a high energy consumption, complex processes, and a low efficiency. Therefore, it is extremely important to develop an organic wastewater treatment process with a high efficiency, a low energy consumption, simple operations, and a low cost.

Currently, organic wastewater is mainly treated by adsorption, biological treatment, and advanced oxidation (Journal of Environmental Management. 2016. 177. 341-355). Among these technologies, although having an extremely-low energy consumption and environmental friendliness, the disadvantages of biodegradation, such as a long degradation time and biological resistance, are also obviously prominent. Fenton oxidation, as a type of advanced oxidation processes (AOPs), is widely used in the current industrial organic wastewater treatment due to mild reaction conditions, a high removal efficiency, wide applicable targets, and a strong ability to destroy chemical bonds of refractory organic matters (Environmental Processes. 2017. 4 (1), 283-302). Fenton oxidation refers to the generation of hydroxyl radicals by oxidants (such as $H_2O_2$ and $O_3$) under the catalysis of ultraviolet light (UV) or $Fe^{2+}$. Due to a high oxidation potential, the hydroxyl radicals can degrade various organic substances by interaction. In addition, studies have shown that the introduction of magnetic fields (MFs) to strengthen the sewage treatment shows desirable effects in advanced oxidation processes, which can effectively improve an efficiency of the sewage treatment, reduce an energy consumption, and is environmental-friendly. Weak magnetic field (WMF) can accelerate the nanoscale zero-valent iron (nZVI)-like Fenton reactions to generate ferrous ions, thereby promoting the degradation of pollutants. Du et al. found that WMF can enhance the removal of sulfamethoxazole (SMX) by a $Fe^0/H_2O_2$ system, and showed that WMF did not change the reactive oxygen species, but accelerated the dissolution of iron (Comptes Rendus Chimie. 2005. 8 (6). 963-970). Fu et al. found that WMF can effectively enhance the degradation of acid orange 7 (AO7) by zeolite-supported nanoscale zero-valent iron (z-nZVI)/PMS; and compared with the z-nZVI/PMS process, the z-nZVI/PMS/WMF process can improve a removal efficiency by 25% and a degradation efficiency by 2 to 3 times on the AO7 at a pH value of 3. The experimental results show that WMF promotes the dissolution of iron, which in turn accelerates the generation of $O_{2-}$ and improves the reactivity (Separation and Purification Technology. 230. 115886).

In advanced oxidation methods, a catalyst is one of the key factors affecting the efficiency of catalytic oxidation, with its type, form, dosage, and usage all having an important influence on a catalytic effect. Iron is relatively non-toxic, environmental-friendly, and more cost-effective than other transition metals (Water Research. 2009. 43 (3). 684-694), and is therefore a desirable choice as a catalyst. At present, iron-based catalysts have been widely used in water purification researches. Among the iron-based catalysts, $Fe^{2+}$ is undoubtedly a kind of desirable catalyst in the Fenton oxidation system, but $Fe^{2+}$ may generate hydroxides in a certain pH range. Therefore, researchers gradually focus on $Fe^0$. $Fe^0$ is considered to be a continuous and slow release source of $Fe^{2+}$ when being chemically reacted with hydrogen peroxide. The $Fe^0$ as a source of $Fe^{2+}$ has been extensively studied. The disadvantages of a separate $Fe^{2+}$ system can be effectively avoided by continuous circulation of $Fe^{2+}$ in the system; moreover, a higher surface area of nanoscale $Fe^0$ increases an ability to activate the hydrogen peroxide, thereby achieving a higher reactivity. Although pristine nZVI particles have a high specific surface area and abundant active surface sites, their operability is poor in in-situ and ex-situ remediation of organic-contaminated water. Therefore, coating a surface of modified nZVI particles with an organic stabilizer can enhance steric hindrance and electrostatic repulsion of the nZVI particles. The nZVI particles supported by porous materials have a large specific surface area and an interstitial structure, which can provide a more stable loading site to avoid passive layer formation and agglomeration of the nZVI particles. In the existing researches, Weng et al. prepared bentonite-supported Fe/Ni (B—Fe/Ni) nanoparticles, with a removal efficiency on amoxicillin in water of over 94% (Colloids and Surfaces A Physicochemical and Engineering Aspects. 2014. 443. 404-409). Bonaiti et al. successfully prepared carbon-coated nZVI particles, and achieved certain results in removing heavy metal pollutants in water, indicating that the carbon-coated nZVI particles have a great potential in water remediation (IOP Conference Series Earth and Environmental Science. 2017. 64 (1). 012070.). However, the catalyst prepared by these methods has a high cost and a complicated preparation process. Therefore, it becomes a focus of the present disclosure to improve an activity of the catalyst while reducing a production cost.

One possibility to improve the catalytic activity is to increase a specific surface area of the catalyst, and electrospinning is a promising method to fabricate nanofibers. Electrospinning means that under the action of a high-voltage electric field, a polymer solution or melt is charged to form pendant cone-shaped droplets at the end of a nozzle. When charge repulsion on a surface of the droplet exceeds its surface tension, a tiny polymer fluid, referred to as "jet" for short, may be ejected from the droplet surface at a high speed. These jets undergo high-speed stretching by electric field force, solvent volatilization, and solidification in a short distance, and eventually deposit on a receiving electrode to form a polymer fiber membrane with a diameter of nanometers. The electrospun fibers constituting a membrane have a large specific surface area, a high porosity, controllable pore size distribution of the nanofibers, and a low mass transfer resistance, which are favorable for catalyst loading. In addition, thermally-induced phase separation (TIPS) can further increase the specific surface area of the electrospun fibers constituting the membrane. During the TIPS, the polymer membrane forms smaller pores on a lower temperature side and larger pores on a higher temperature side. This makes it possible to form fibers with a high specific surface area and rich in small pores on an outer surface of the fiber membrane and macropores on an interior by electrospinning combined with TIPS. However, the combination of nZVI with the organic polymer material carrier may greatly reduce magnetic properties of the material, thereby reducing a catalytic performance under an external weak magnetic field.

SUMMARY

An objective of the present disclosure is to provide an efficient and stable magnetic nanofiber membrane and a preparation method and use thereof in efficiently degrading an organic pollutant in a weak magnetic field. The present disclosure aims to avoid complicated steps, a low magnetic strength, and the difficulty in recycling during the existing preparation of magnetic nanofiber membrane-based catalysts. The magnetic nanofiber membrane has a high specific surface area, a desirable porosity, an excellent mechanical strength, and satisfactory magnetic properties. The membrane effectively exerts a synergistic effect of the nZVI particles and an organic polymer material carrier, avoids easy oxidation of a catalyst surface and easy particle agglomeration, enhances a catalytic activity of the magnetic nanofiber membrane, and improves an efficiency in organic wastewater treatment.

To achieve the above objective, the present disclosure provides the following technical solutions:

The present disclosure provides a preparation method of an efficient and stable magnetic nanofiber membrane, including the following steps:

dissolving polyacrylonitrile or polystyrene, nanoscale zero-valent iron (nZVI) particles, and n-octyltrimethylammonium bromide in N,N-dimethylformamide, and mixing uniformly by magnetic stirring preferably in a magnetic stirrer at 200 rpm for 1 h to 3 h to obtain a spinning solution;

subjecting the spinning solution to low-temperature electrospinning using a receiver at −196° C. and −180° C.; and vacuum-drying a resulting fiber membrane to obtain the efficient and stable magnetic nanofiber membrane.

Further, the polyacrylonitrile has an average molecular weight of 200,000 to 300,000, and the polystyrene has an average molecular weight of 40,000 to 50,000.

Further, the spinning solution has 100 g/L to 350 g/L of the polyacrylonitrile or the polystyrene by concentration, has the nZVI particles and the polyacrylonitrile or the polystyrene at a mass ratio of (1-3):(3-4), and has 1 mmol/L to 2 mmol/L of the n-octyltrimethylammonium bromide.

Further, the nZVI particles have a particle size of 10 nm to 100 nm.

Further, during the electrospinning, the membrane is immersed in a low-temperature source of liquid nitrogen.

Further, the electrospinning is conducted at a voltage of +10 kV to +20 kV and −3 kV to −1 kV under an ambient humidity of 20% to 50% for 25 min to 60 min with a spacing of 3 cm to 9 cm between a receiver and a needle tip, and a low-temperature source is poured into the receiver.

Further, the vacuum-drying is conducted at 25° C. and a vacuum degree of 0 for 6 h to 9 h.

The present disclosure further provides an efficient and stable magnetic nanofiber membrane prepared by the preparation method.

The present disclosure further provides use of the efficient and stable magnetic nanofiber membrane in degrading an organic pollutant in a weak magnetic field.

Further, the weak magnetic field has a magnetic field intensity of 0.0001 T to 0.1 T.

In the present disclosure, the combination of low temperature and electrospinning can improve a porosity and a mechanical strength of the fiber membrane, and enhance magnetic properties of the magnetic nanoparticles. With the help of TIPS, and combined with a high cooling rate and a low phase splitting temperature provided by the low temperature source, a driving force of phase separation is increased, and a mechanism of the phase separation is changed from nucleation growth to spinodal decomposition. This results in the formation of a polymer-rich phase and a polymer-poor phase within the solution, leading to an increased porosity of the fibers after solidification. In addition, steps such as high-temperature calcination and acidification are also avoided, and a porous fiber membrane material with a high specific surface area can be prepared in one step. Therefore, the preparation method of the present disclosure simplifies a preparation process, reduces a preparation cost, and retains physicochemical properties (such as electrical and thermal conductivity) of the organic high polymer base material to improve a mechanical strength of the magnetic nanofiber membrane. In addition, low temperature can decrease the intensity of magnetic molecular motion and reduce the disordered collisions between molecules without affecting the mutual arrangement of magnetic atoms, thereby enhancing the magnetic properties of the material. When conducting catalytic oxidation by the magnetic nanofiber membrane under an external weak magnetic field, the dissolution of iron can be accelerated; and under the pulling of a magnetic gradient force, the paramagnetic $Fe^{2+}$ tends to move to a position with a higher magnetic flux intensity. As a result, $Fe^{2+}$ ions are not uniformly distributed, forming a $Fe^{2+}$ concentration gradient, which provides an additional driving force for the reaction. Accordingly, the catalyst has an enhanced catalytic activity to efficiently degrade the organic pollutants. Therefore, in the present disclosure, the low temperature-electrospinning technology combines nZVI with an organic high polymer substrate to prepare a nanofiber membrane material with high magnetic properties. The material avoids easy agglomeration of nZVI particles and weakened magnetic properties in the fiber membrane, fully activates a catalytic performance of the material, and achieves efficient catalytic degradation of the organic pollutants.

The present disclosure has the following technical effects:

1. In the present disclosure, a magnetic nanofiber membrane material with a high specific area and a desirable porosity is obtained with nZVI through a one-step method by the low temperature-electrospinning technology as well as the TIPS. The method avoids a low mechanical strength and a high preparation cost of the nanofiber membrane due to complicated steps in the preparation of nanofiber membrane-based catalysts in the past.

2. In the present disclosure, the magnetic properties of the magnetic fiber membrane material are further enhanced by low temperature, thereby effectively exerting the magnetic properties of the nZVI. The present disclosure solves the problem that the combination of nZVI with an organic polymer material carrier may greatly reduce the magnetic properties of the material, thereby reducing a catalytic performance under an external weak magnetic field. Therefore, the catalytic performance of the magnetic nanofiber membrane material is fully utilized, achieving efficient degradation of the organic pollutants under the external weak magnetic field.

3. In the present disclosure, the magnetic nanofiber membrane material is used in the environmental remediation of organically-polluted water bodies under the external weak magnetic field, with magnetic properties of the magnetic nanofiber membrane being fully exerted. The external weak magnetic field provides an additional driving force to the reactions, which further improves a catalytic efficiency and an activity and service life of the catalyst per unit volume. Therefore, the efficiency of organic wastewater treatment is improved to reduce a cost of the wastewater treatment, with desirable economic benefits.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

Many exemplary examples of the present disclosure are now described in detail. The detailed description should not be considered as a limitation to the present disclosure, but should be understood as a more detailed description of certain aspects, features, and implement solutions of the present disclosure.

It should be understood that terms described in the present disclosure are merely used to describe specific embodiments and are not intended to limit the present disclosure. In addition, for a numerical range in the present disclosure, it should be understood that each intermediate value between an upper limit and a lower limit of the range is also specifically disclosed. Each smaller range between any stated value or intermediate value in a stated range and any other stated value or intermediate value in the stated range is also included in the present disclosure. The upper and lower limits of these smaller ranges can independently be included or excluded from the range.

Unless otherwise stated, all technical and scientific terms used herein have the same meaning as commonly understood by those of ordinary skill in the art described in the present disclosure. Although the present disclosure describes only preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated documents, the content of this specification shall prevail.

It is obvious to a person skilled in the art that a plurality of modifications and variations can be made to the specific embodiments of the present specification without departing from the scope or spirit of the present disclosure. Other embodiments derived from the description of the present disclosure will be obvious to the skilled person. The specification and embodiments of the present application are merely exemplary.

As used herein, "including", "having", "containing", and the like are all open-ended terms, which means including but not limited to.

In the following examples, the experimental method of unrecited specific conditions is usually in accordance with conventional conditions in the art or conditions suggested by the manufacturers; the raw materials and reagents used, unless otherwise specified, are obtained from commercial channels such as conventional markets.

Figure 1:
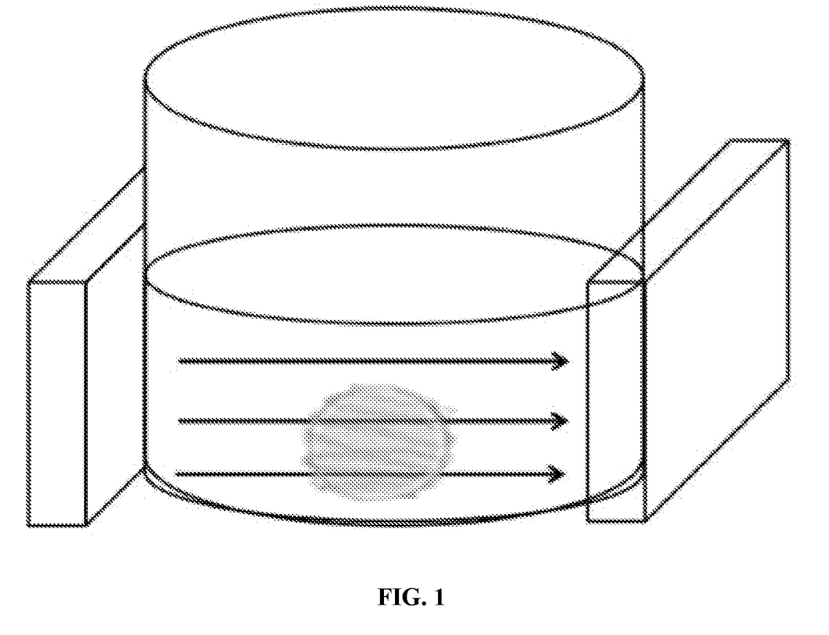
FIG. 1 shows a device for catalytic degradation of organic pollutants by a weak magnetic field-enhanced magnetic nanofiber membrane provided by the present disclosure.

FIG. 1 shows a device for catalytic degradation of organic pollutants by a weak magnetic field-enhanced magnetic nanofiber membrane provided by present disclosure.

EXAMPLE 1

A preparation method of an efficient and stable magnetic nanofiber membrane included the following steps:

(1) preparation of a 100 g/L polyacrylonitrile solution: 5 g of a polyacrylonitrile solid (with an average molecular weight of 200,000) was dissolved in 50 mL of N,N-dimethylformamide, added with a magneton, and stirred on a magnetic stirrer at 200 rpm for 15 min;

(2) preparation of a nanofiber membrane:

1) 1.25 g of nZVI with a particle size of 100 nm and 0.0126 g of n-octyltrimethylammonium bromide were dissolved in 50 ml of the 100 g/L polyacrylonitrile solution, and stirred on a magnetic stirrer for 2 h to obtain a solution;

2) 4 mL of the solution was extracted using a syringe, a spacing was adjusted to 4 cm between a needle tip and a receiver, a voltage of an electrospinning machine was adjusted to +10 kV and −1 kV, and the receiver was filled with liquid nitrogen; during the electrospinning, the receiver was at −185° C. to −180° C., a room temperature was 25° C., and an ambient humidity was 50%; the electrospinning was conducted for 25 min after the receiver was stable, and the membrane was immersed in the liquid nitrogen throughout the electrospinning; and 3) an obtained membrane was dried in a vacuum dryer at 25° C. and a vacuum degree of 0 for 6 h to obtain the efficient and stable magnetic nanofiber membrane.

The porosity and mechanical properties of the magnetic nanofiber catalytic membrane were tested, and results showed that the magnetic nanofiber membrane had a high porosity, uniform distribution of pores in the material, a desirable specific surface area, a strong water permeability, and an excellent mechanical strength.

Figure 2:
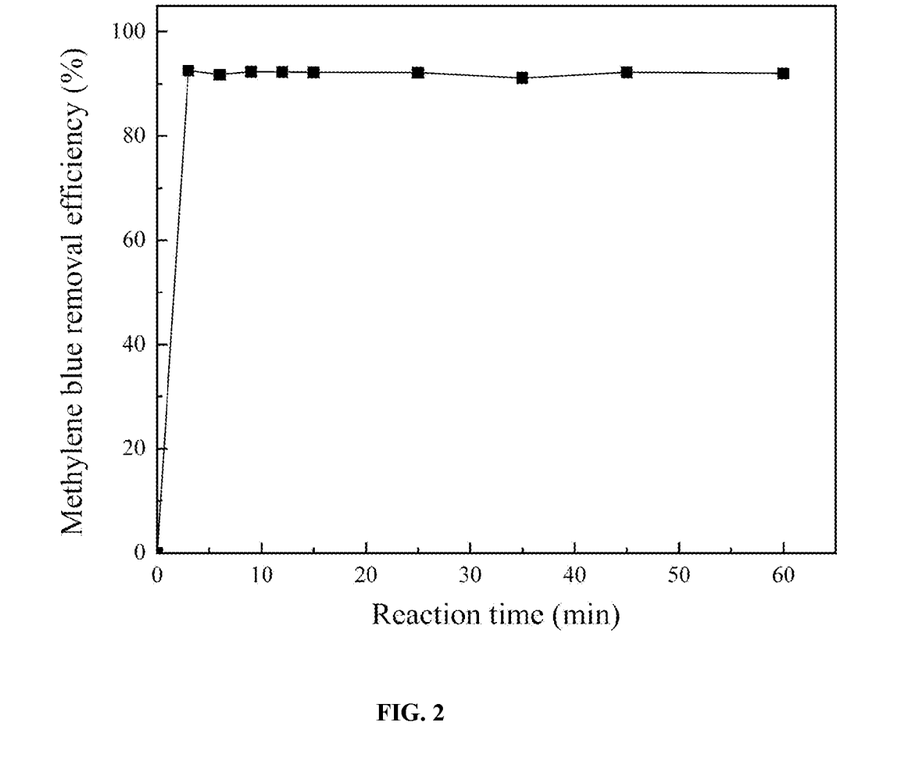
FIG. 2 shows a variation of a removal efficiency of methylene blue with a reaction time in Example 1.

A performance test of the efficient and stable magnetic nanofiber membrane in the example included the following steps:

With a shaking bed reactor as a reaction device and the magnetic nanofiber membrane as a catalyst, an experiment of catalytic oxidation degradation of organic matters in wastewater was conducted combined with a weak magnetic field generating device. The coils were located outside a fixed bed and distributed on an outer periphery of the reactor, each with a diameter being larger than that of the reactor, to ensure that the magnetic field fully covered the catalyst. The reaction conditions were as follows: 50 mL of 20 mg/L methylene blue was added in a 250 mL blue cap bottle, added with 50 mL of 4 mM/L hydrogen peroxide, added with 40 mg of the magnetic nanofiber membrane, and adjusted to a pH value of 3 with a dilute nitric acid/dilute sodium hydroxide solution; the blue cap bottle was placed into a constant-temperature shaker to conduct a reaction at 200 rpm and a magnetic field intensity of 0.0001 T for 20 min; samples were collected every 3 min, and a degradation effect was detected by an ultraviolet absorbance method (at a wavelength of 664 nm). The results were shown in FIG. 2. After 20 min of reaction, the absorbance decreased by 92% and tended to be stable. This indicated that the magnetic nanofiber membrane prepared in this example had a degradation efficiency reaching 92% on the methylene blue within 20 min.

Figure 5:
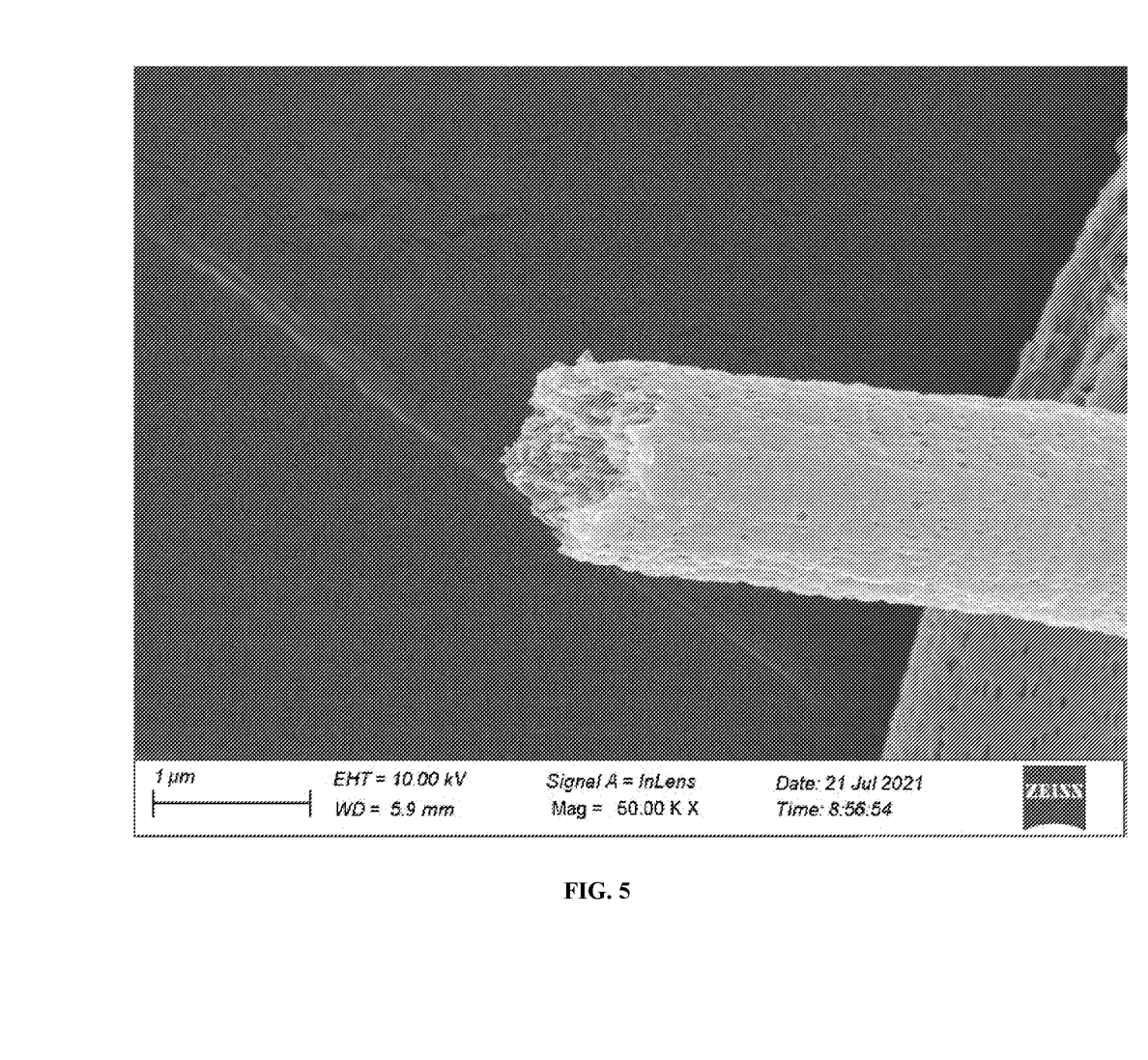
FIG. 5 shows a scanning electron microscopy (SEM) image of a magnetic nanofiber membrane prepared in Example 1.

FIG. 5 showed a SEM image of the magnetic nanofiber membrane prepared in this example. It was seen from FIG. 5 that the magnetic nanofiber membrane had a highly-porous structure on the surface and the interior, and the pores were evenly distributed inside the material; the material also had a high surface roughness with its outer surface rich in small pores. The small pore size made the nZVI difficult to leach out; and the high porosity effectively improved a contact efficiency between the reactants and the catalyst.

EXAMPLE 2

A preparation method of an efficient and stable magnetic nanofiber membrane included the following steps:

(1) preparation of a 200 g/L polyacrylonitrile solution: 10 g of a polyacrylonitrile solid (with an average molecular weight of 300,000) was dissolved in 50 mL of N,N-dimethylformamide, added with a magneton, and stirred on a magnetic stirrer at 200 rpm for 15 min;

(2) preparation of a nanofiber membrane:

1) 5 g of nZVI with a particle size of 50 nm and 0.0189 g of n-octyltrimethylammonium bromide were dissolved in 50 ml of the 200 g/L polyacrylonitrile solution, and stirred on a magnetic stirrer for 2 h to obtain a solution;

2) 4 mL of the solution was extracted using a syringe, a spacing was adjusted to 6 cm between a needle tip and a receiver, a voltage of an electrospinning machine was adjusted to +15 kV and −2 kV, and the receiver was filled with liquid nitrogen; during the electrospinning, the receiver was at −185° C. to −190° C., a room temperature was 25° C., and an ambient humidity was 35%; the electrospinning was conducted for 40 min after the receiver was stable, and the membrane was immersed in the liquid nitrogen throughout the electrospinning; and 3) an obtained membrane was dried in a vacuum dryer at 25° C. and a vacuum degree of 0 for 8 h to obtain the efficient and stable magnetic nanofiber membrane.

Figure 3:
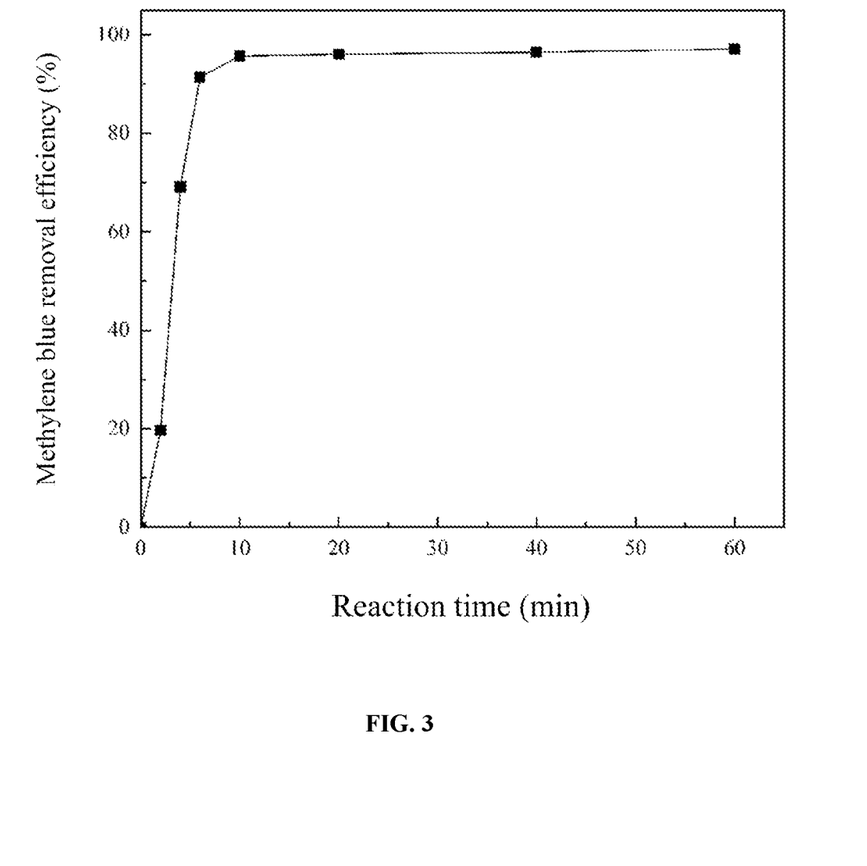
FIG. 3 shows a variation of a removal efficiency of methylene blue with a reaction time in Example 2.

A performance test of the efficient and stable magnetic nanofiber membrane in the example included the following steps:

With a shaking bed reactor as a reaction device and the magnetic nanofiber membrane as a catalyst, an experiment of catalytic oxidation degradation of organic matters in wastewater was conducted combined with a weak magnetic field generating device. The coils were located outside a fixed bed and distributed on an outer periphery of the reactor, each with a diameter being larger than that of the reactor, to ensure that the magnetic field fully covered the catalyst. The reaction conditions were as follows: 50 mL of 20 mg/L methylene blue was added in a 250 mL blue cap bottle, added with 50 mL of 4 mM/L hydrogen peroxide, added with 40 mg of the magnetic nanofiber membrane, and adjusted to a pH value of 3 with a dilute nitric acid/dilute sodium hydroxide solution; the blue cap bottle was placed into a constant-temperature shaker to conduct a reaction at 200 rpm and a magnetic field intensity of 0.01 T for 20 min; samples were collected every 3 min, and a degradation effect was detected by an ultraviolet absorbance method (at a wavelength of 664 nm). The results were shown in FIG. 3. After 20 min of reaction, the absorbance decreased by 96% and tended to be stable. This indicated that the magnetic nanofiber membrane prepared in this example had a degradation efficiency reaching 96% on the methylene blue within 20 min.

Figure 6:
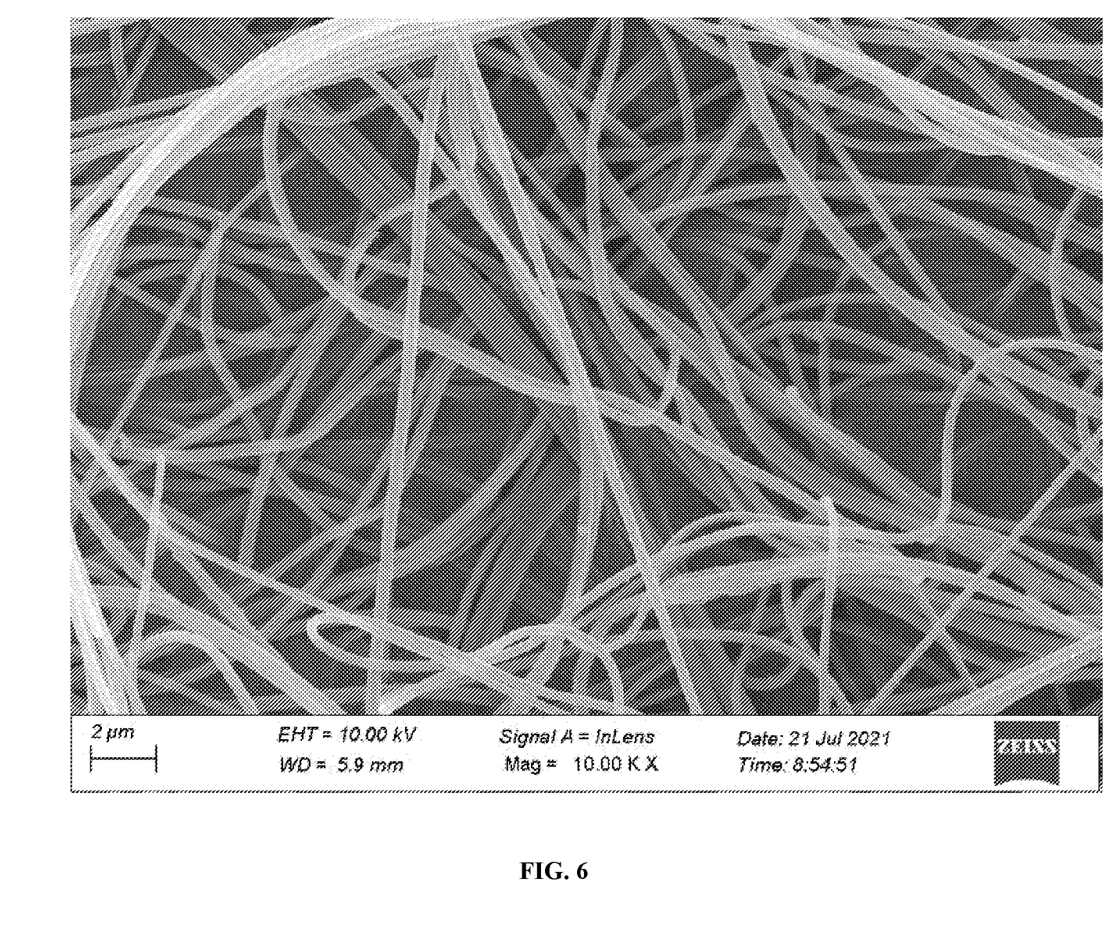
FIG. 6 shows a SEM image of a magnetic nanofiber membrane prepared in Example 2.

FIG. 6 showed a SEM image of the magnetic nanofiber membrane prepared in this example. It was seen from FIG. 6 that the fibers had uniform thickness, distinct distribution, and no mutual connection, indicating that a shape of the fibers had not changed during the spinning, and the fibers still maintained desirable morphological characteristics and a high mechanical strength.

EXAMPLE 3

A preparation method of an efficient and stable magnetic nanofiber membrane included the following steps:

(1) preparation of a 300 g/L polyacrylonitrile solution: 15 g of a polystyrene solid (with an average molecular weight of 45,000) was dissolved in 50 mL of N,N-dimethylformamide, added with a magneton, and stirred on a magnetic stirrer at 200 rpm for 15 min;

(2) preparation of a nanofiber membrane:

1) 10 g of nZVI with a particle size of 10 nm and 0.0252 g of n-octyltrimethylammonium bromide were dissolved in the 300 g/L polyacrylonitrile solution, and stirred on a magnetic stirrer for 2 h to obtain a solution;

2) 4 mL of the solution was extracted using a syringe, a spacing was adjusted to 8 cm between a needle tip and a receiver, a voltage of an electrospinning machine was adjusted to +20 kV and −3 kV, and the receiver was filled with liquid nitrogen; during the electrospinning, the receiver was at −190° C. to −196° C., a room temperature was 25° C., and an ambient humidity was 20%; the electrospinning was conducted for 60 min after the receiver was stable, and the membrane was immersed in the liquid nitrogen throughout the electrospinning; and 3) an obtained membrane was dried in a vacuum dryer at 25° C. and a vacuum degree of 0 for 9 h to obtain the efficient and stable magnetic nanofiber membrane.

Figure 4:
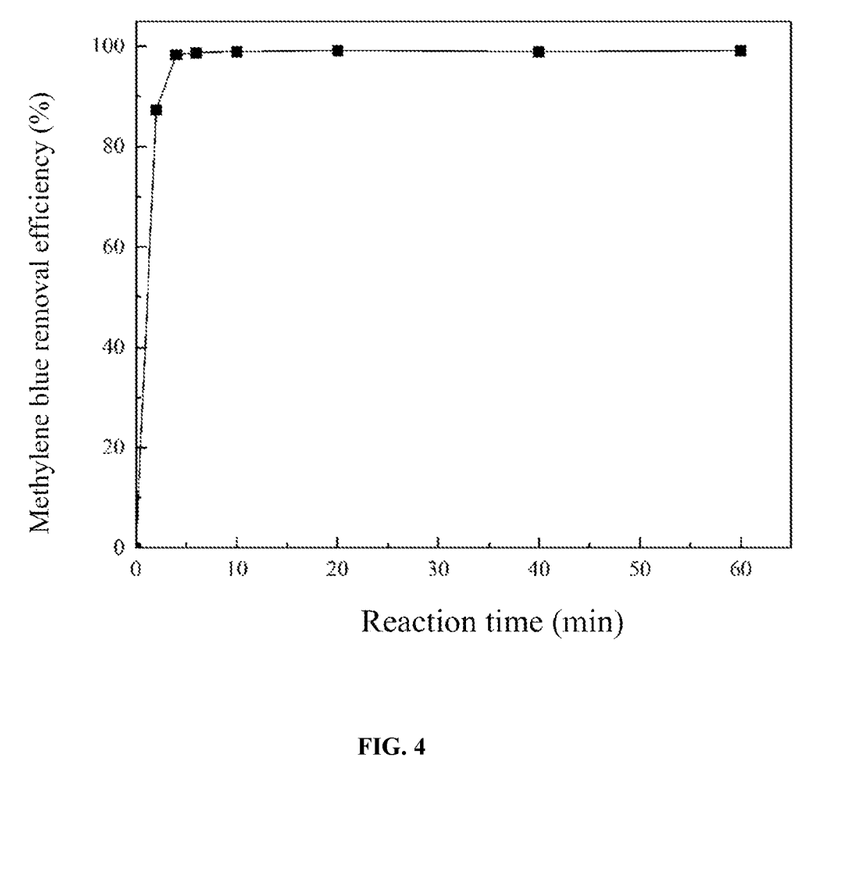
FIG. 4 shows a variation of a removal efficiency of methylene blue with a reaction time in Example 3.

A performance test of the efficient and stable magnetic nanofiber membrane in the example included the following steps:

With a shaking bed reactor as a reaction device and the magnetic nanofiber membrane as a catalyst, an experiment of catalytic oxidation degradation of organic matters in wastewater was conducted combined with a weak magnetic field generating device. The coils were located outside a fixed bed and distributed on an outer periphery of the reactor, each with a diameter being larger than that of the reactor, to ensure that the magnetic field fully covered the catalyst. The reaction conditions were as follows: 50 mL of 20 mg/L methylene blue was added in a 250 mL blue cap bottle, added with 50 mL of 4 mM/L hydrogen peroxide, added with 40 mg of the magnetic nanofiber membrane, and adjusted to a pH value of 3 with a dilute nitric acid/dilute sodium hydroxide solution; the blue cap bottle was placed into a constant-temperature shaker to conduct a reaction at 200 rpm and a magnetic field intensity of 0.1 T for 20 min; samples were collected every 3 min, and a degradation effect was detected by an ultraviolet absorbance method (at a wavelength of 664 nm). The results were shown in FIG. 4. After 20 min of reaction, the absorbance decreased by 99% and tended to be stable. This indicated that the magnetic nanofiber membrane prepared in this example had a degradation efficiency reaching 99% on the methylene blue within 20 min.

COMPARATIVE EXAMPLE 1

This example was the same as Example 1, the only difference was that: in 2) of step (2), "receiver was filled with liquid nitrogen" was omitted.

Results: compared with Example 1, the magnetic nanofiber membrane of this comparative example had a low porosity, uneven distribution of pores in the material, a small specific surface area, and an average mechanical strength.

The properties of the magnetic nanofiber membrane prepared in this comparative example were tested in the same manner as that in Example 1. Compared with Example 1, in the catalytic oxidation degradation of methylene blue, the magnetic nanofiber membrane of this comparative example had a degradation efficiency of 75% after 20 min of reaction, indicating a reduced degradation efficiency.

Comparative Example 2

This example was the same as Example 1, the only difference was that: in step (1), the polyacrylonitrile solid had an average relative molecular weight of 100,000.

Results: compared with Example 1, the magnetic nanofiber membrane of this comparative example had a low mechanical strength, a loose structure, and a poor durability.

The properties of the magnetic nanofiber membrane prepared in this comparative example were tested in the same manner as that in Example 1. Compared with Example 1, in the catalytic oxidation degradation of methylene blue, the magnetic nanofiber membrane of this comparative example had a degradation efficiency of 87% after 20 min of reaction, indicating a reduced degradation efficiency.

COMPARATIVE EXAMPLE 3

This example was the same as Example 1, the only difference was that: in step (1), the polyacrylonitrile solid had an average relative molecular weight of 500,000.

Results: compared with Example 1, the magnetic nanofiber membrane of this comparative example had a poor water permeability and a low porosity.

The properties of the magnetic nanofiber membrane prepared in this comparative example were tested in the same manner as that in Example 1. Compared with Example 1, in the catalytic oxidation degradation of methylene blue, the magnetic nanofiber membrane of this comparative example had a degradation efficiency of 80% after 20 min of reaction, indicating a reduced degradation efficiency.

COMPARATIVE EXAMPLE 4

This example was the same as Example 1, the only difference was that: in 1) of step (2), the nZVI had a particle size of 500 nm.

The properties of the magnetic nanofiber membrane prepared in this comparative example were tested in the same manner as that in Example 1. Compared with Example 1, in the catalytic oxidation degradation of methylene blue, the magnetic nanofiber membrane of this comparative example had a degradation efficiency of 85% after 20 min of reaction, indicating a reduced degradation efficiency.

COMPARATIVE EXAMPLE 5

This example was the same as Example 1, the only difference was that: in the performance test, the magnetic field intensity was 10 T.

The results showed that compared with Example 1, in the catalytic oxidation degradation of methylene blue, the magnetic nanofiber membrane of this comparative example had a degradation efficiency of 83% after 20 min of reaction, indicating a reduced degradation efficiency.

The above examples are only intended to describe the preferred implementations of the present disclosure, but not to limit the scope of the present disclosure. Various alterations and improvements made by those of ordinary skill in the art based on the technical solution of the present disclosure without departing from the design spirit of the present disclosure shall fall within the scope of the appended claims of the present disclosure.

What is claimed is:

1. A preparation method of an efficient and stable magnetic nanofiber membrane, comprising the following steps:
dissolving polyacrylonitrile or polystyrene, nanoscale zero-valent iron (nZVI) particles, and n-octyltrimethylammonium bromide in N,N-dimethylformamide, and mixing uniformly to obtain a spinning solution; subjecting the spinning solution to low-temperature electrospinning using a receiver at −196° C. and −180° C.; and vacuum-drying a resulting fiber membrane to obtain the efficient and stable magnetic nanofiber membrane.

2. The preparation method according to claim 1, wherein the polyacrylonitrile has an average molecular weight of 200,000 to 300,000, and the polystyrene has an average molecular weight of 40,000 to 50,000.

3. The preparation method according to claim 1, wherein the spinning solution has 100 g/L to 350 g/L of the polyacrylonitrile or the polystyrene by concentration, has the nZVI particles and the polyacrylonitrile or the polystyrene at a mass ratio of (1-3):(3-4), and has 1 mmol/L to 2 mmol/L of the n-octyltrimethylammonium bromide.

4. The preparation method according to claim 1, wherein the nZVI particles have a particle size of 10 nm to 100 nm.

5. The preparation method according to claim 1, wherein during the electrospinning, the membrane is immersed in a low-temperature source of liquid nitrogen.

6. The preparation method according to claim 1, wherein the electrospinning is conducted at a voltage of +10 kV to +20 kV and −3 kV to −1 KV under an ambient humidity of 20% to 50% for 25 min to 60 min with a spacing of 3 cm to 9 cm between a receiver and a needle tip, and a low-temperature source is poured into the receiver.

7. The preparation method according to claim 1, wherein the vacuum-drying is conducted at 25° C. and a vacuum degree of 0 for 6 h to 9 h.

* * * * *